United States Patent [19]

Uhlenhoff

[11] Patent Number: 4,594,678
[45] Date of Patent: Jun. 10, 1986

[54] DIGITAL PARALLEL COMPUTING CIRCUIT FOR COMPUTING $P = XY + Z$ IN A SHORTENED TIME

[75] Inventor: Arnold Uhlenhoff, Emmendingen, Fed. Rep. of Germany

[73] Assignee: ITT Industries, Inc., New York, N.Y.

[21] Appl. No.: 465,386

[22] Filed: Feb. 10, 1983

[30] Foreign Application Priority Data

Feb. 18, 1982 [EP] European Pat. Off. ........ 82200196.2

[51] Int. Cl.⁴ ............................................. G06F 7/544
[52] U.S. Cl. ..................................... 364/736; 364/758
[58] Field of Search ......................... 364/736, 757, 758

[56] References Cited

U.S. PATENT DOCUMENTS 3,019,977  2/1962  Dvinker et al. ...................... 364/736
3,761,698  9/1973  Stephenson .......................... 364/757
3,900,724  8/1975  McIver et al. ....................... 364/758

OTHER PUBLICATIONS

Smith, "External Arithmetic Processor", *Computer Design*, vol. 17, No. 12, Dec. 1978, pp. 144–149.

Primary Examiner—David H. Malzahn
Attorney, Agent, or Firm—Donald J. Lenkszus

[57] ABSTRACT

To increase the computing speed when forming the product of a first binary number (x) and a second binary number (y) and then adding (xy+z) a third binary number (z) by means of a multiplier (mw) and an adder (aw), the individual full-adder stages of the adder (aw) except the stage for the sign digit are inserted as an additional row between the next to the last row and the output row of the multiplier, the full-adder for the sign digit of the output row (az) being also omitted. The two omitted stages are replaced with a sign-correcting stage (vk).

7 Claims, 7 Drawing Figures $r = m + n + 2$

DIGITAL PARALLEL COMPUTING CIRCUIT FOR COMPUTING $P=XY+Z$ IN A SHORTENED TIME

BACKGROUND OF THE INVENTION

The present invention relates to a digital parallel computing circuit for positive and negative binary numbers, the latter having to be represented in two's complement for forming the product of a first binary number and a second binary number and then adding a third binary number by means of an adder consisting of full-adder stages and by means of a multiplier consisting of full adders arranged in columns and rows and each having an AND gate associated therewith, which AND gates may be omitted in the output row.

Multipliers of such design are described in detail, for example, in a book by A. Shah et al,"Integrierte Schaltungen in digitalen Systemen", Vol. 2, Basel, 1977, pp. 171 to 193 and 211 to 216, see particularly FIGS. IX.62 to IX.66, IX.67, and IX.77 on pages 172, 174 to 177, and 212. All these multipliers are parallel multipliers, in contrast to the serial and parallel-serial multipliers dealt with elsewhere in that book. For high-speed multiplications as are required in digital signal processors, only the aforementioned parallel multipliers are suitable, and the multipliers used in the present invention are only parallel multipliers.

As follows from the Proceedings of the "9. Internationaler Kongress Mikroelektronik", Munich, Nov. 10-12, 1980, pages 56 to 62 and 105 to 108, the basic arithmethic operation in such high-speed signal processors consists in the formation of the product of two binary numbers and the subsequent addition of a third binary number. The signal processor shown on page 62 of those Proceedings includes a high-speed multiplier followed by an adder. The arithmetic unit shown on page 108 is only described as consisting of a multiplier and an adder.

The adders of the prior art just mentioned are, of course, parallel adders, whose computation time is determined essentially by the time required to form the carry of the most significant digit, cf. the above-mentioned book by A. Shah et al, pages 92 to 117. If an arrangement as disclosed in the second-mentioned reference is chosen, i.e., a multiplier followed by an adder, the computation time of the adder adds to that of the multiplier. On the other hand, however, the computation time of the multiplier is determined essentially by the computation time of the full adders in the output row of the multiplier, because the carry up to the most significant digit of the product must be generated in this row. In some designs of such multipliers, this output row is a complete parallel adder, see FIGS. IX.63 to IX.65 of the first-mentioned book by A. Shah et al. The computation time of the parallel computing circuit consisting of a multiplier followed by an adder is thus composed of that of the multiplier without output row, that of the output row, and that of the adder, the two latter computation times being approximately equal, while the former is smaller than the two latter by a factor of about 2 to 4.

SUMMARY OF THE INVENTION

For conventional high-speed signal processors, however, this computation time is too long. Accordingly, the object of the invention as claimed is to shorten the computation time of a digital parallel computing circuit of the above kind, i.e., of a circuit comprising a multiplier and an adder. According to the invention, this is achieved essentially by inserting the adder into the multiplier, namely between the multiplier's next to the last row and the output row, instead of placing it behind the multiplier. This permits the full-adder stages of the adder to be connected like a multiplier row as far as their augend, addend and carry inputs or their sum and carry outputs are concerned, so that the exclusive carry generation in this row from the least significant full-adder stage to the most significant full-adder stage—which is responsible for the long computation time—can be dispensed with. The individual full-adder stages of the adder inserted at this point are connected like a multiplier row, which means that the carry signal received by each full-adder stage of a row is the carry output signal from the next less-significant full-adder stage of the preceding row. The adder inserted in accordance with the invention thus contributes only insignificantly to the prolongation of the computation time of the multiplier, because the carry generation in the adder itself is no longer necessary. The parallel computation circuit according to the invention thus has a computation time which is not appreciably longer than that of the pure multiplier.

It is composed of the carry generation time of the output row and the slightly increased computation time of the multiplier with the adder inserted in accordance with the invention. The computation time of the sign-correcting stage, too, is considerably shorter than the carry generation time of the separate adder in the prior art.

BRIEF DESCRIPTION OF THE DRAWINGS

The invention will now be explained in more detail with reference to the accompanying drawings, in which.

DETAILED SPECIFICATION

Figure 1:
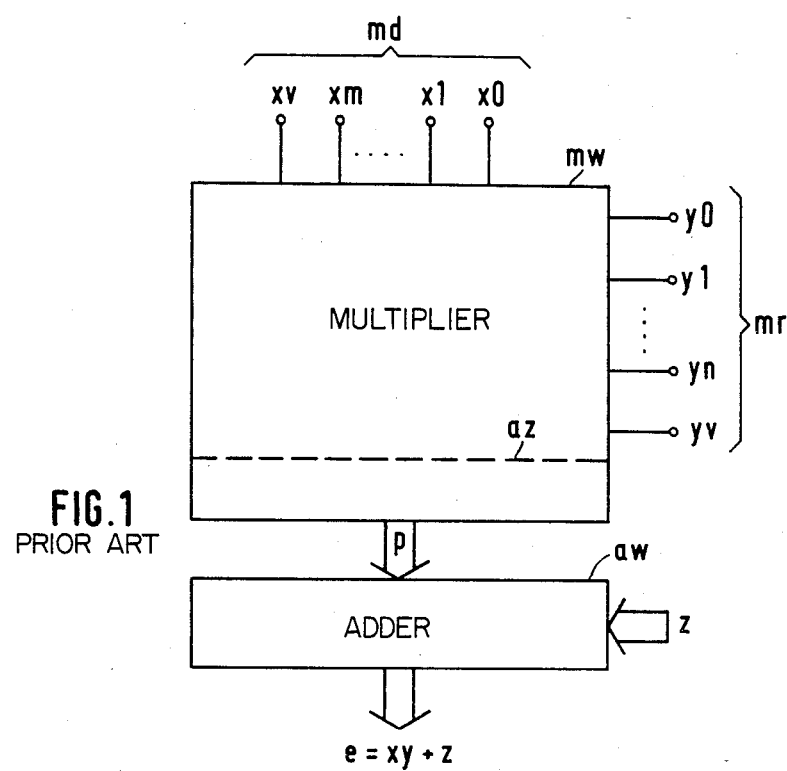
FIG. 1 shows highly schematically the design of a parallel computing circuit as disclosed in the prior art.

FIG. 1 shows schematically the design of a parallel computing circuit as disclosed in the prior art. The multiplier mw is one of the various known types; in connection with the invention it is only important that it should have the output row az.

The multiplier mw has parallel multiplicand inputs md and parallel multiplier inputs mr. They are fed with the digit signals $x0, x1 \ldots xm, xv$ of the first binary number x and $y0, y1 \ldots yn, yv$ of the second binary number y, respectively. The product $p=xy$ is applied to one parallel input of the adder aw, and the third binary number z is applied to the other parallel input of this adder. The output of the adder aw thus provides the result $e=xy+z$.

As is usual in algebraic operations, i.e., when calculating with positive and negative binary numbers, such numbers contain not only the numerical digits but also an additional sign digit (index v) which designates the algebraic sign of the number, i.e., positive or negative. As is stated in the above-mentioned book by A. Shah et al, positive binary numbers are commonly characterized by the sign digit 0, while negative binary numbers are characterized by the sign digit 1.

To simplify the arithmetic operation and the circuit types necessary therefor, the so-called two's complement representation is chosen for the subtraction of binary numbers, i.e., if a subtraction is to be performed, the two's complement of the number to be subtracted is added by means of the same full adders as those used for addition. Since, on the other hand, no distinction is made in algebra between the rules of addition and subtraction, but only the rules of addition are applied to positive and negative numbers, negative binary numbers are generally represented, inter alia, in two's complements (there is also the one's complement representation, which, however, is of no interest within the scope of the invention).

In two's complement representation, there is a single representation for the number 0, namely 00 ... 00, i.e., the binary number 0 is regarded as a positive number (the sign digit is 0). For a given number of digits e.g., 4, the greatest positive number is 0111, which corresponds to the number +7 in the decimal number system. According to the rules of formation of two's complements (invert all digits of the binary number and then add 1 to the least significant digit), the greatest negative number that can be represented with the aforementioned four digits is 1000, which corresponds to decimal number −8. If two numbers consisting of the same number of digits are multiplied, the greatest positive result is obtained from the multiplication of the two greatest negative numbers, which results in a binary number of the general form 0100 ... 0; in the above four-digit example, decimal $(-8)\cdot(-8)$ thus gives the eight-digit binary number 01000000, corresponding to decimal +64. On the other hand, the greatest negative number occurring in such a multiplication has the form 11 ..., where each of the six points represents an arbitrary binary number. The just described characteristics of the number area occuring in the multiplication of binary numbers in two's complement representation are utilized in the invention.

Figure 2:
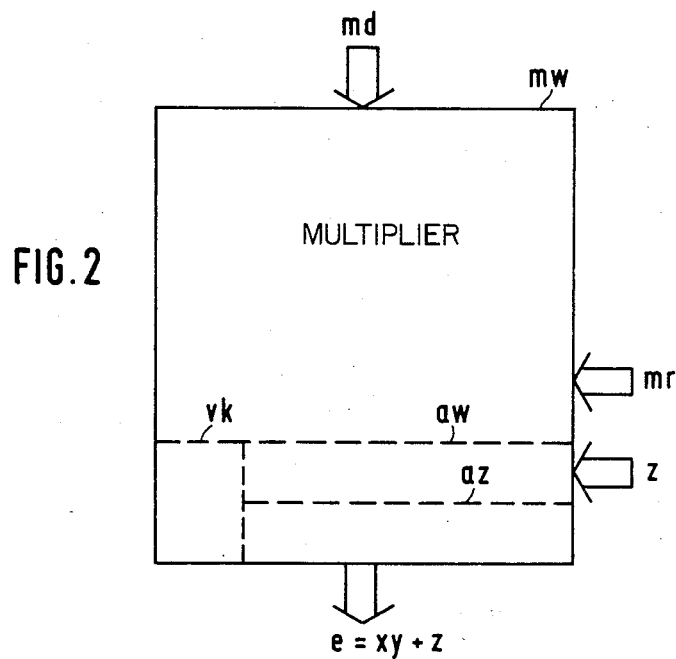
FIG. 2 shows highly schematically the design of the parallel computing circuit according to the invention.

FIG. 2 shows the basic design of the parallel computing circuit according to the invention. The adder aw has been included in the multiplier as the next to the last row of the overall arrangement, i.e., it is inserted between the next to the last row and the output row of the multiplier mw. In the adder aw and the output row az, the full-adder stage and the full adder, respectively, for the respective sign digit has been replaced with the sign-correcting stage vk. The third binary number z is applied to the carry inputs of the full-adder stages of the adder.

Figure 3:
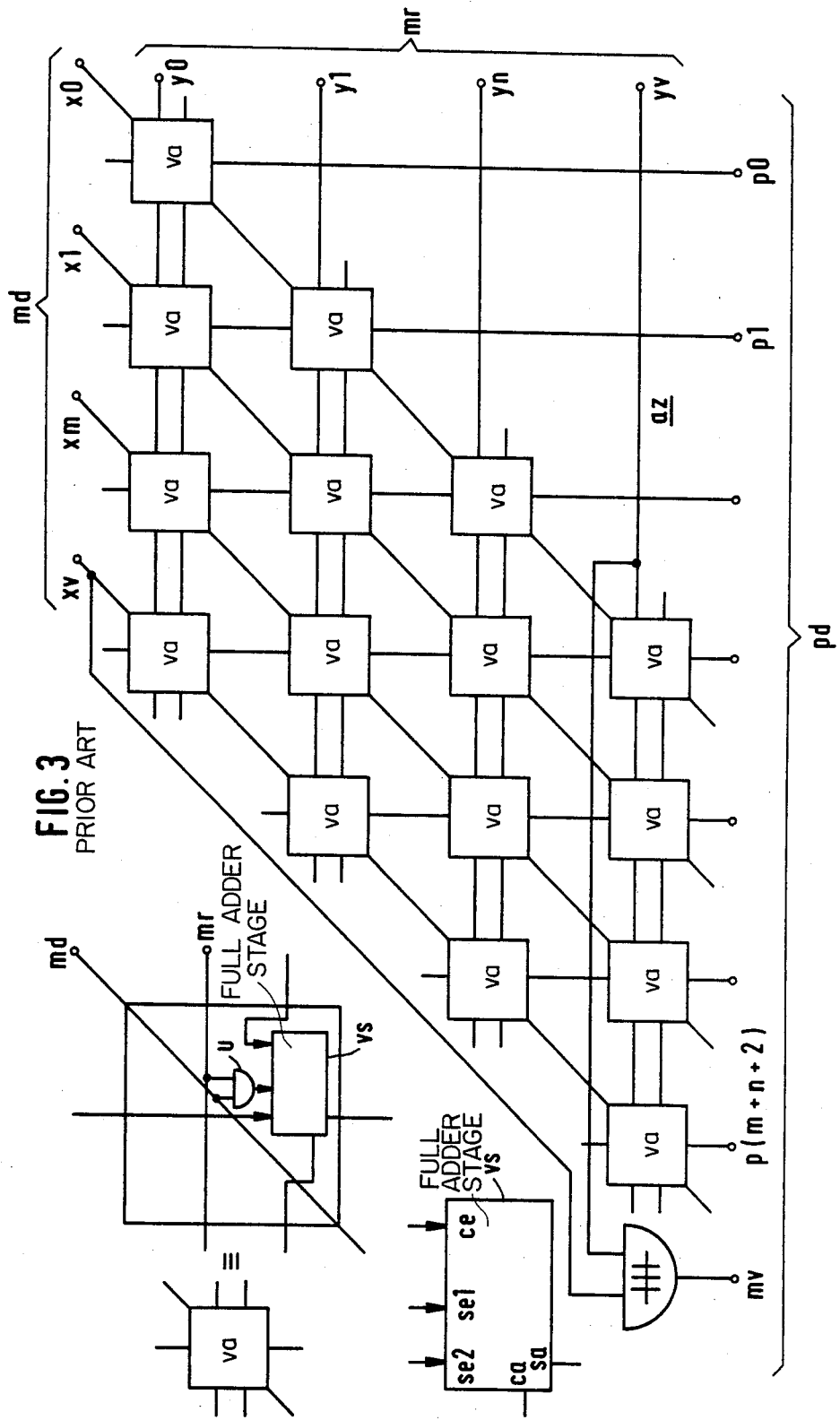
FIG. 3 shows the design of a conventional multiplier for explanatory purposes.

To illustrate the design of conventional multipliers, FIG. 3 shows schematically the arrangement disclosed in FIG. IX.76 on page 212 of the book by A. Shah et al, which figure, in turn, is a schematic representation of FIG. IX.62 on page 172. FIG. 3 is to show for the purposes of the description of the present invention that each square cell of the two-dimensional matrix of rows and columns contains the full-adder stage vs and the AND gate u, whose two inputs are fed with the digit signals of the multiplicand md and the multiplier mr, respectively. The full-adder stage vs has the augend input se1, the addend input se2, the carry input ce, the sum output sa, and the carry output ca as usual. These are connected to the corresponding inputs and outputs of the adjacent cells in the manner shown, so that the regular arrangement of FIG. 3 is obtained, which is also referred to as an "iterative array" in the literature mentioned above. What is of interest is that in this arrangement, the number of digits of the product pd is equal to the sum of the number of digits m of the multiplicand md and the number of digits n of the multiplier mr. In the present case, where $m=n=2$, the highest weight $m+n+2$ lies in the seventh digit position $p(m+n+2)$, while the eighth digit pv is the sign digit of the product pd. The weight of the product digits is equal to the corresponding 0, 1 ... $m+n+2$ power of 2 for the product digits $p0, p1 ... p(m+n+2)$. The sign mv of the product pd is provided by the exclusive-OR gate shown, which combines the sign digits xv and yv in modulo-2.

The characteristic feature of the interconnection of the individual cells in FIG. 3 is that the carry output of a cell is connected to the carry input of the next cell to the left in the same row. The iterative array of FIG. 3 thus consists of conventional full adders arranged in rows, with carries formed in each row.

As shown in the above-mentioned figures of the book by A. Shah et al, however, other iterative arrays are also possible, such as arrays in which the carry output of a cell is connected to the carry input of the next cell to the left in the next-lower row. In such arrays, only the last row is a conventional full adder forming carries within this last row, i.e., the output row az. In this output row, the AND gates u present in the other cells are then omitted.

Figure 4:
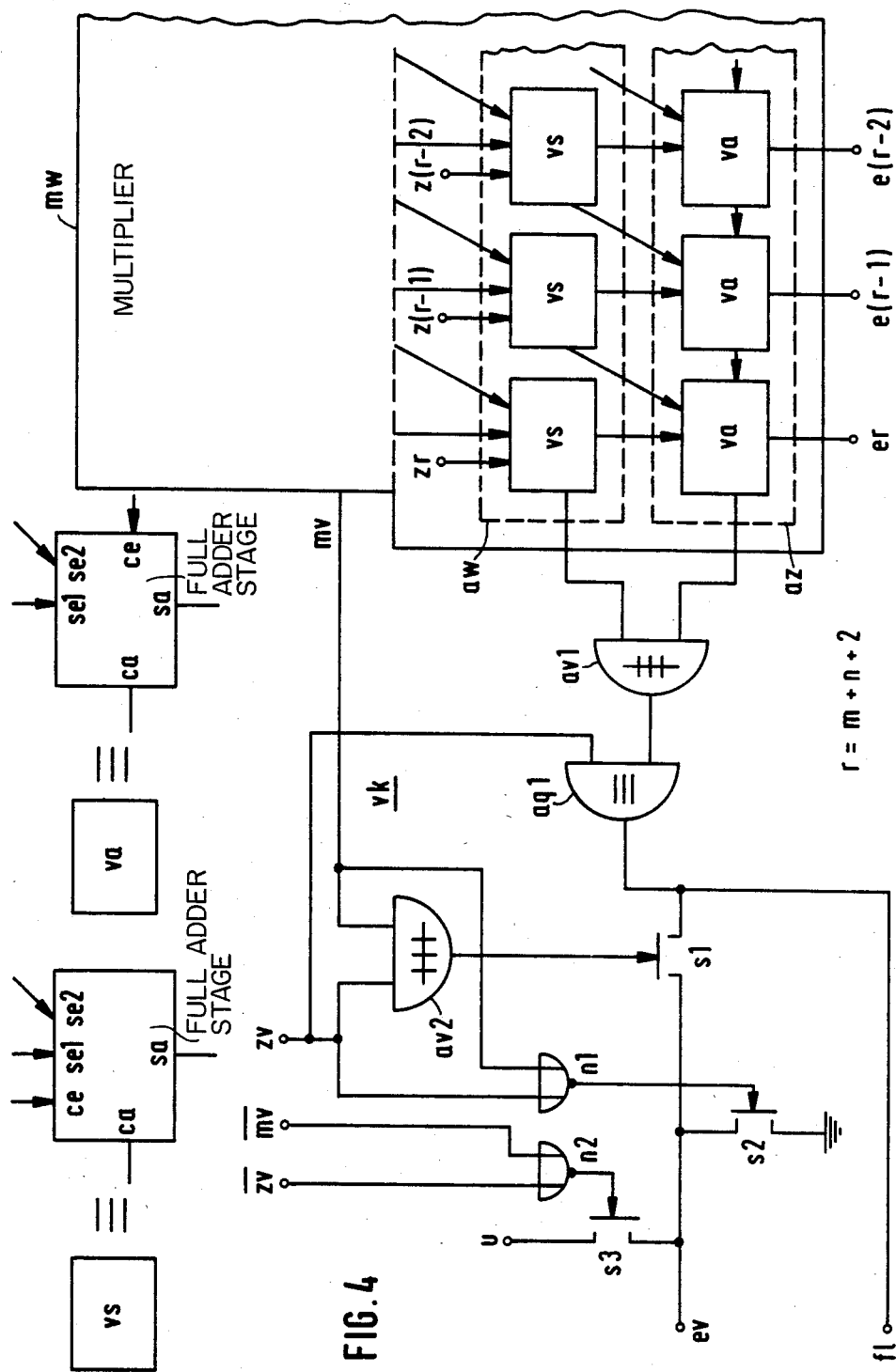
FIG. 4 shows a first embodiment of the sign-correcting stage.

FIG. 4 shows a preferred embodiment of the sign-correcting stage vk of FIG. 2, which is illustrated together with the essential stages of the multiplier mv. Of the adder aw, which is incorporated in the multiplier mw, the three most significant full-adder stages vs are shown; similarly, the three most significant full adders va of the output row az are shown. The assignment of the inputs and outputs of the full-adder stages and the full adders follows from the separate representation on the upper left in FIG. 4. Taking this assignment into account, the augend input se1 of the respective full-adder stage vs is connected to the sum output sa of the cell of the same weight in the next to the last row of the multiplier mw, and the addend input se2 is connected to the carry output ca of the next lower-order cell in the next to the last row, while the carry input ce of the respective full-adder stage is fed with the respective digit signal of the third binary number z; of these digit signals, the three most significant ones, zr, $z(r-1)$, and $z(r-2)$, are shown.

The augend input se1 of a full adder va of the output row az is connected to the sum output sa of the full-adder stage vs of the same weight, while the addend input se2 is connected to the carry output ca of the next lower-order full-adder stage vs. The carry input ce of a full adder va is connected to the carry output ca of the next full adder va to the right. The outputs of these full adders provide the digit signals of the result e, of which the digit signals er, $e(r-1)$, and $e(r-2)$ are shown. For the serial number, the following relation holds:

$r = m + n + 2$. This follows from the fact that, according to the designation chosen in FIGS. 1 and 3, the serial numbers m, n specify that exponent of the binary value of this digit which is smaller than the number of digits by 1. Accordingly, the serial number r also gives the exponent of the binary value of the digit with the serial number r.

The first embodiment of the sign-correcting stage vk (FIG. 4) consists of the first and second exclusive-OR gates (EXORs) av1, av2, the first exclusive-NOR gate (EXNOR) aq1, the first and second two-input NOR gates n1, n2, and the three switching elements s1, s2, s3. These parts of the sign-correcting stage are interconnected as follows. The carry outputs ca of the most significant full adder stage vs and the most significant full adder va are each coupled to one of the two inputs of the first exclusive-OR gate av1, whose output is connected to one input of the first exclusive-NOR gate aq1. The second input of the latter is fed with the signal of the sign digit zv of the third binary number z, which signal is also applied to one input of the second exclusive-OR gate av2 and to one input of the first NOR gate n1. The sign output mv of the multiplier mw is coupled to the second input of the second exclusive-OR gate av2 and to the second input of the first NOR gate n1. The two inputs of the second NOR gate n2 are fed with the inverted signal of the sign digit $\overline{zv}$ of the third binary number z and with the inverted signal $\overline{mv}$ of the sign output of the multiplier mw, respectively.

The output of the first exclusive-NOR gate aq1 is connected to the sign output ev of the computing circuit via the controlled current path of the first switching element s1, whose control input is connected to the output of the second exclusive-OR gate av2. The sign output ev is grounded via the controlled current path of the second switching element s2 and connected to the supply-voltage source U via the controlled current path of the third switching element s3. The control inputs of the second and third switching elements s2 and s3 are connected to the outputs of the first and second NOR gates n1, n2, respectively. The output of the first exclusive-NOR gate aq1 is connected to a further output fl of the computing circuit, which output provides an overflow signal, i.e., in positive logic, a H level appears at this output fl if the number of digits of the result exceeds the capacity of the computing circuit. This may be the case, for example, if an r-digit third binary number z is added to an r-digit product pd, and if this addition results in a carry to the next more significant digit, which is not present.

Such an overflow signal can be used, for example, to drive a limiter stage which delivers a result agreeing with the maximum result that can be represented with the existing number of digits. In the general case of FIG. 4, the result is wrong when such an overflow occurs.

Figure 5:
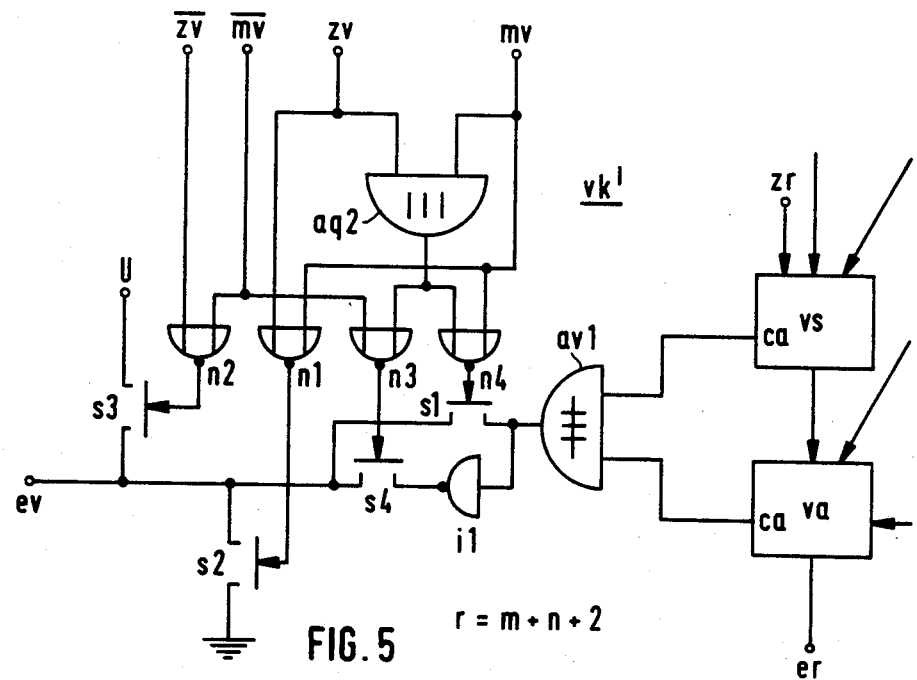
FIG. 5 shows a second embodiment of the sign-correcting stage.

FIG. 5 shows a second embodiment of the sign-correcting stage in which the overflow output fl of FIG. 4 is not necessary because this correcting stage already has the aforementioned limiting feature with respect to the sign digit.

The sign-correcting stage vk' of FIG. 5 consists of the first exclusive-OR ("EXOR") gate av1, the second exclusive-NOR ("EXNOR") gate aq2, the four two-input NOR gates n1, n2, n3, n4, the four switching elements s1, s2, s3, s4, and the inverter i1. These parts of the sign-correcting stage are interconnected as follows. The carry outputs ca of the most significant full-adder stage vs and the most significant full-adder va of the multiplier mw are each connected to one of the two inputs of the first exclusive-OR gate av1, whose output s coupled to the sign output ev of the computing circuit, on the one hand, through the controlled current path of the first switching element s1 and, on the other hand, through the inverter i1 and the controlled current path of the fourth switching element s4. The sign output mv of the multiplier mw is coupled to one of the two inputs of the second exclusive-NOR gate aq2, whose other input is fed with the signal of the sign digit zv of the third binary number z, and whose output is connected to one input of the third NOR gate n3 and to one input of the fourth NOR gate n4. The other input of the fourth NOR gate n4 and one input of the first NOR gate n1 are connected to the sign output mv of the multiplier mw. The other input of the third NOR gate n3 is fed with the inverted output signal $\overline{mv}$ of the sign output mv, which signal is also applied to one input of the second NOR gate n2, whose other input is fed with the inverted signal $\overline{zv}$ of the sign digit zv.

The sign output ev of the computing circuit is grounded through the controlled current path of the second switching element s2 and connected to the supply-voltage source U through the controlled current path of the third switching element s3. The four switching elements s1 to s4 have their control inputs connected to the NOR gates n4, n1, n2, and n3, respectively.

Figure 6:
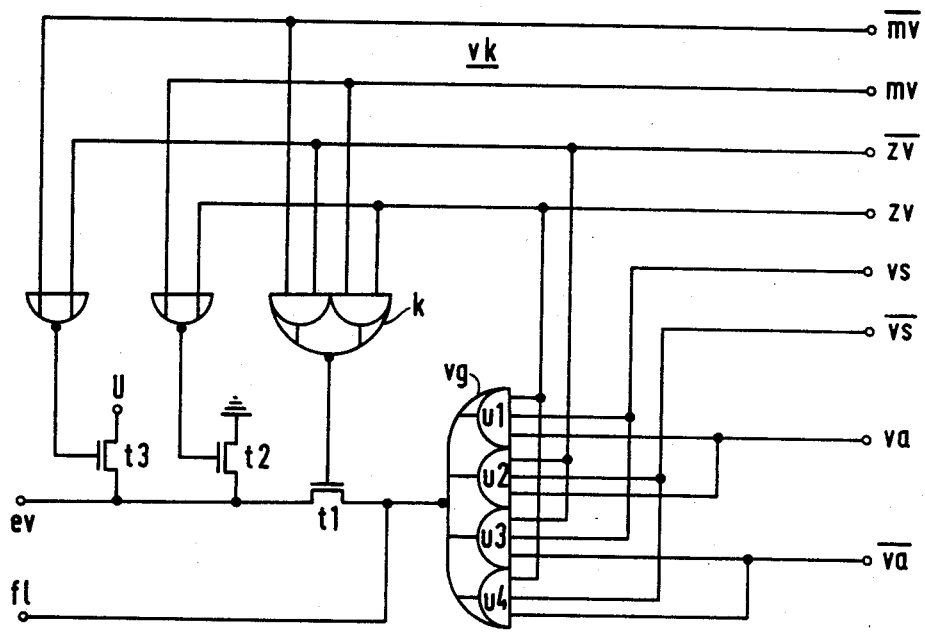
FIG. 6 is a circuit diagram of the first embodiment of the sign-correcting stage of FIG. 4 for implementation using MOS technology.

The invention is especially suited for being implemented with insulated-gate field-effect transistor integrated circuits, i.e., so-called MOS circuits. For such an implementation, FIG. 6 shows the circuit diagram of the sign-correcting stage vk of FIG. 4. The switching elements used there are enhancement-mode insulated-gate field-effect transistors t1, t2, t3, with the gate of the transistor t1 connected to the output of the complex gate k, and the gates of the transistors t2 and t3 connected to the outputs of the associated NOR gates.

Since, in MOS technology, general logic-gate types are implemented with given basic types of MOS gates, FIG. 6 shows for the second exclusive-OR gate av2 of FIG. 4 the structure of the corresponding complex gate k. It consists of two two-input AND elements having their outputs NORed. The graphic representation of the complex gate k in FIG. 6 indicates that the two AND elements have no load resistor of their own, but that only the complex gate k as a whole has such a resistor. The two inputs of one of the two AND elements are connected to the sign output mv of the multiplier mw and fed with the signal of the sign digit zv of the third binary number z, respectively, while the inputs of the other AND element are fed with the inverted signals $\overline{zv}$ and $\overline{mv}$, respectively.

The first exclusive-OR gate av1 and the first exclusive-NOR gate aq1 of FIG. 4 have been replaced in FIG. 6 with the multiple gate vg, which consists of four three-input AND elements u1, u2, u3, u4, whose outputs are NORed. The sign signal zv of the third binary number z is applied directly to the first inputs of the first and fourth AND elements u1, u4, and in inverted form to the first inputs of the second and third AND elements u2, u3. The output signal of the most significant full-adder stage vs is applied directly to the second inputs of the first and third AND elements u1, u3, and in inverted form to the second inputs of the second and fourth AND elements u2, u4. The output signal of the most significant full adder va is applied directly to the third inputs of the first and second AND elements u1, u2, and in inverted form to the third inputs of the third and fourth AND elements u3, u4.

Figure 7:
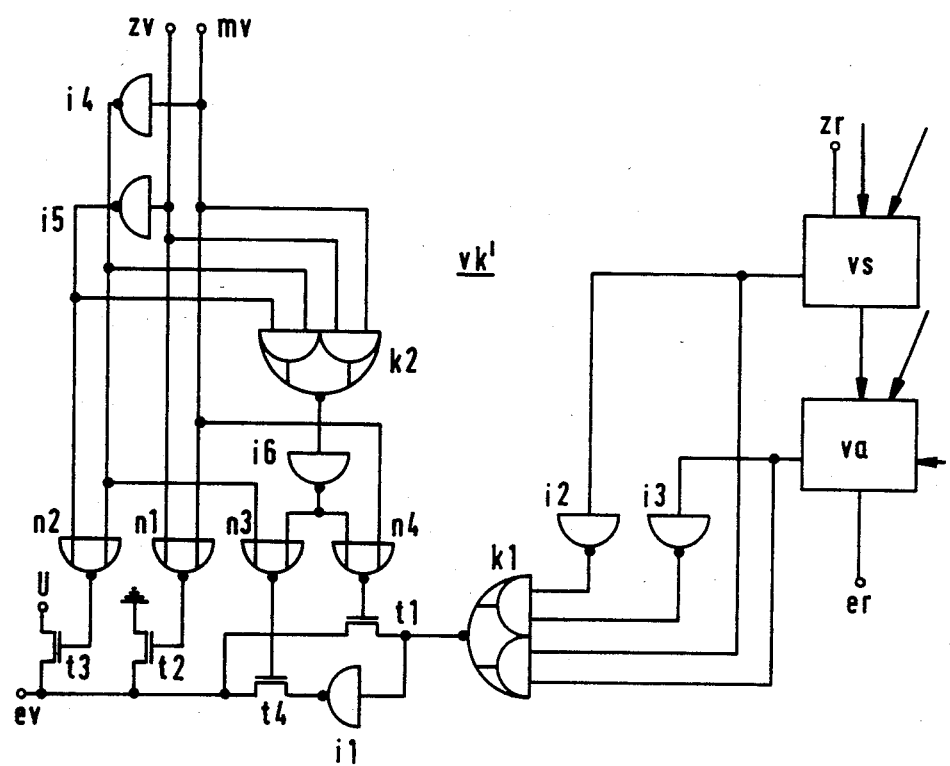
FIG. 7 is a circuit diagram of the sign-correcting stage of FIG. 5 for implementation using MOS technology.

FIG. 7 shows the circuit diagram of the sign-correcting stage vk' of FIG. 5 for implementation with MOS circuitry. Like in FIG. 5, the switching elements are enhancement-mode insulated-gate field-effect transistors t1, t2, t3, t4 having their gates connected to the outputs of the associated NOR gates as described above. The first exclusive-OR gate av1 of FIG. 5 now consists of the first complex gate k1 with the two associated inverters i2, i3, which, if the inverter i1 of FIG. 5 is called the "first inverter", are the second and third inverters. The complex gate k1 consists of two two-input AND elements having their outputs NORed. The inputs of one of the two AND elements are connected to the carry outputs ca of the full-adder stage vs and the full adder va, respectively, and each of these two carry outputs is also connected to one input of the other AND element through the second inverter i2 and the third inverter i3, respectively.

Similarly, the second exclusive-NOR gate aq2 of FIG. 5 has been replaced with the second complex gate k2, which is of the same design as the first complex gate k1, and with which are associated the fourth and fifth inverters i4, i5 as well as the sixth inverter i6, which follows the output of the complex gate k2. The two inputs of one of the two AND elements are fed with the signal of the sign digit zv of the third binary number z and with the signal of the sign output mv of the multiplier mw, respectively. These two signals are applied to the two inputs of the other AND element of the second complex gate k2 through the fifth inverter i5 and the fourth inverter i4, respectively.

It is obvious that in the embodiment of FIG. 6, the inverted signals $\overline{mv}$, $\overline{zv}$, $\overline{vs}$, $\overline{va}$ can also be produced from the noninverted signals by means of inverters, as is shown in FIG. 7 by the inverters i2 . . . i5.

The computing circuit according to the invention provides at the carry output ev the sign of the result of the multiplication and addition independently of the sequence of operations practically immediately if the sign of the result of the multiplication, i.e., of the product, and that of the third binary number to be added, z, are alike, i.e., if both signs are positive or negative. If the signs are positive, the second controlled current path s2 or the corresponding second transistor t2 will be turned on by the first NOR gate n1, so that the sign output ev will be virtually grounded. If the two signs are negative, the third controlled current path s3 will be turned on by the second NOR gate n2, thus connecting the sign output ev to the potential of the supply-voltage source U. In positive logic, ground potential corresponds to the L level and, thus, to the binary digit 0, and the potential of the supply-voltage source U corresponds to the H level and, thus, to the binary digit 1. In these two cases, the first controlled current path s1 is constantly off and, thus, separated from the output of the first exclusive-NOR gate aq1 of FIG. 4 or the first exclusive-OR gate av1 of FIG. 5.

If the signs of the product pd and the third binary number are different, i.e., if one is negative and the other positive, the second and third controlled current paths s2, s3 will be kept off by the first NOR gate n1 and the second NOR gate n2, respectively, and the fourth controlled current path s4 of FIG. 5, which was turned on in the previously considered case of like signs, will be off as well. Finally, the first controlled current path s1 of FIGS. 4 and 5 is on if the signs are unlike.

The action of the two embodiments of the sign-correcting circuit, vk, vk', can be described by the following Table:

| Output of | | | | | |
|---|---|---|---|---|---|
| vs | va | zv | mv | av1 | ev |
| arbitrary | arbitrary | 0 | 0 | arbitrary | 0 |
|  |  | 0 | 0 |  | 0 |
|  |  | 0 | 0 |  | 0 |
|  |  | 0 | 0 |  | 0 |
| 0 | 0 | 1 | 0 | 0 | 0 |
| 1 | 0 | 1 | 0 | 1 | 1 |
| 0 | 1 | 1 | 0 | 1 | 1 |
| 1 | 1 | 1 | 0 | 0 | 0 |
| 0 | 0 | 0 | 1 | 0 | 1 |
| 1 | 0 | 0 | 1 | 1 | 0 |
| 0 | 1 | 0 | 1 | 1 | 0 |
| 1 | 1 | 0 | 1 | 0 | 1 |
| arbitrary | arbitrary | 1 | 1 | arbitrary | 1 |
|  |  | 1 | 1 |  | 1 |
|  |  | 1 | 1 |  | 1 |
|  |  | 1 | 1 |  | 1 |

A parallel computing circuit according to the invention for a sixteen-digit multiplicand and an eight-digit multiplier and for the subsequent addition of an up to 23-digit binary number was implemented using MOS technology. It had a computing speed of about 200 ns, while an experimental setup of the prior art circuit with a pure multiplier followed by an adder had a computing speed of about 350 ns. This practical circuit included a multiplier as shown in the above-mentioned FIG. IX.64 of the book by A. Shah et al, the "preset-carry adder" being a circuit as disclosed in applicant's own prior European Application No. 80 10 7091.3 or a switched-carry adder as disclosed in applicant's own prior European Application No. 80 10 6668.7, which was used as the output row az of the multiplier mw.

I claim:

1. A digital parallel computing circuit for positive and negative binary numbers, said negative binary numbers being represented in two's complement form, said circuit forming an output binary number which is the sum of a third binary number (z) with the product (x·y) of a first binary number (x) and a second binary number (y), said computing circuit comprising:

an adder including full-adder stages;

a multiplier including full adders including outputs, said full adders arranged in a plurality of columns and rows, said columns being arranged according to the binary weight of the digits of said output binary number, said rows including an output row, and each said full adder having an AND gate associated therewith except for said adders in said output row;

said full-adder stages forming an additional row between the next to the last of said rows and said output row;

each said full-adder stage including an augend and addend input, one of said augend or addend input of the full adder stage in the column corresponding to the most significant binary weight and the augend and addend inputs of the other ones of said full adder stages being connected to the outputs of said full adders within said next to the last of said rows of said multiplier;

each full-adder stage having a sum output and each full-adder having an augend input, each said full-adder stage sum output being connected to said augend input of a full adder in the same one of said columns and in said output row;

each said full-adder stage having a carry output and each said full adder having an addend input with each said full-adder stage carry output being connected to the addend input of the full adder in said output row which is in the next more significant binary weighted column;

each said full-adder stage having a carry input, said third binary number be represented by digit signals, and said third binary number digit signals being applied to said full-adder stage carry inputs; and sign-correcting stage means coupled to said full-adder stages and said full-adders for generating a sign signal for said output number.

2. A parallel computing circuit as claimed in claim 1, wherein said sign-correcting stage means includes a first exclusive-OR gate, a second exclusive-OR gate, a first exclusive-NOR gate, first, second and third switching elements having control inputs, and first and second NOR gates and wherein:

said carry outputs of the most significant full-adder stage and the most significant full adder in said output row are each connected to a respective one of the inputs of said first exclusive-OR gate;

wherein said third binary number includes a sign digit and wherein the sign digit of the third binary number and the output of said first exclusive-OR gate are each applied to a respective one of the input of said first exclusive-NOR gate;

wherein said multiplier has a sign output and wherein the sign output of the multiplier and the sign digit of the third binary number are each applied to a respective one of the inputs of said second exclusive-OR gate;

wherein said computing circuit includes a sign output and wherein the output of said first exclusive-NOR gate is connected by said first switching element to said computing circuit sign output, said first switching element having its control input connected to the output of the second exclusive-OR gate, said sign output being grounded by said second switching element and connected to a supply-voltage source by the third switching element;

said control inputs of the second and third switching elements being connected to the output of said first NOR gate and to the output of said second NOR gate, respectively; and the multiplier sign output and the sign digit of the third binary number being directly applied to one of the inputs of said first NOR gate, and in inverted form to one of the inputs of said second NOR gate.

3. A parallel computing circuit as claimed in claim 2, wherein said first, second, and third switching elements are enhancement-mode insulated-gate field-effect transistors.

4. A parallel computing circuit as claimed in claim 1, wherein said sign-correcting stage includes an exclusive-OR gate, first, second, third, and fourth switching elements, an inverter, first, second, third, and fourth NOR gates, and an exclusive-NOR gate, and wherein:

said carry outputs of the most significant full-adder stage and the most significant full adder in said output row are each connected to a respective one of the inputs of said exclusive-OR gate;

wherein said multiplier has a sign output and wherein the sign output of said multiplier and the sign digit of said third binary number are each applied to a respective one of the inputs of said exclusive-NOR gate;

wherein said computing circuit has a sign output and wherein the output of said exclusive-OR gate is selectively connected to the sign output of the computing circuit by the first switching element or by said inverter and the fourth switching element, said computing circuit sign output being grounded by said second switching element and connected to a supply-voltage source by the third switching element;

said switching elements having control inputs, the control inputs of the second, third, fourth, and first switching elements being connected to the outputs of first, second, third, and fourth NOR gates, respectively; and said third and fourth NOR gates each having one input connected to the output of the exclusive-NOR gate, the other input of said fourth and third NOR gates being connected to the sign output of said multiplier directly and after inversion, respectively, and the sign ouput of the multiplier and the sign of the third binary number being applied to the inputs of said first NOR gate, directly and to the inputs of said second NOR gate in inverted form.

5. A parallel computing circuit as claimed in claim 4, wherein said first, second, third and fourth switching elements are enhancement-mode insulated-gate field-effect transistors.

6. A parallel computing circuit as claimed in claim 1, wherein:

said sign-correcting stage means comprises a multiple gate including first, second, third, and fourth three-input AND elements and means for providing the logical NOR function over the outputs of said first, second, third and fourth AND elements;

the sign of said third binary number is directly applied to the first inputs of said first and fourth AND elements, and is applied in inverted form to the first inputs of said second and third AND elements;

the output of the most significant full-adder stage is directly applied to the second inputs of said first and third AND elements and is applied in inverted form to the second inputs of said second and fourth AND elements; and the output of the most significant full adder in said output row is directly applied to the third inputs of said first and second AND elements, and is applied in inverted form to the third inputs of the third and fourth AND elements;

wherein said sign-correcting stage means further comprises a second exclusive-OR gate, first, second and third switching elements having control inputs, and first and second NOR gates; and wherein said multiplier has a sign output and wherein the sign output of the multiplier and the sign digit of said third binary number are each applied to a respective one of the inputs of said second exclusive-OR gate;

wherein said computing circuit includes a sign output and wherein the output of said multiple gate is connected, by said first switching element to said computing circuit sign output, said first switching element having its control input connected to the output of said second exclusive-OR gate, said sign output being grounded by said second switching element and connected to a supply-voltage source by said third switching element;

said control inputs of said second and third switching elements being connected to the output of said first NOR gate and to the output of said second NOR gate, respectively; and said multiplier sign output and said sign digit of the third binary number being directly applied to one of the inputs of said first NOR gate, and in inverted form to one of the inputs said second NOR gate.

7. A parallel computing circuit as claimed in claim 6, wherein said first, second, and third switching elements are enhancement-mode insulated-gate field-effect transistors.

* * * * *